United States Patent [19]

Shinkai et al.

[11] Patent Number: 5,599,649

[45] Date of Patent: Feb. 4, 1997

[54] OPTICAL RECORDING MEDIUM

[75] Inventors: Masahiro Shinkai, Chiba; Kenryo Namba, Tokyo, both of Japan

[73] Assignee: TDK Corporation, Tokyo, Japan

[21] Appl. No.: 413,992

[22] Filed: Mar. 30, 1995

[30] Foreign Application Priority Data

Mar. 31, 1994 [JP] Japan .................. 6-087855
Mar. 31, 1994 [JP] Japan .................. 6-087863

[51] Int. Cl.$^6$ ........................................ G11B 7/24
[52] U.S. Cl. ............... 430/270.11; 430/945; 430/272.1; 369/284; 347/105
[58] Field of Search ............ 430/270.11, 271.1, 430/272.1, 273.1, 945; 369/284; 347/2, 105

[56] References Cited

U.S. PATENT DOCUMENTS

| | | | |
|---|---|---|---|
| 4,564,560 | 1/1986 | Tani et al. | 428/411.1 |
| 4,792,487 | 12/1988 | Schubring et al. | 428/342 |
| 5,470,691 | 11/1995 | Arai et al. | 430/273.1 |

FOREIGN PATENT DOCUMENTS

| | | |
|---|---|---|
| 0574860 | 12/1993 | European Pat. Off. . |
| 61-228984 | 10/1986 | Japan . |
| B4-1706 | 1/1992 | Japan . |

*Primary Examiner*—John A. McPherson
*Attorney, Agent, or Firm*—Watson Cole Stevens Davis, PLLC

[57] ABSTRACT

An optical recording medium is provided with a surface layer which is obtained by curing a coating film containing a copolymerizable monomer and/or oligomer having at least one carboxyl group so that printing may be done with an ink containing a water-soluble dye, resulting in improved adhesion. Addition of smectite to the surface layer increases the drying rate and water resistance of printed characters.

24 Claims, 2 Drawing Sheets

- Si, Al
- Al, Fe, Mg
○ O
⊙ OH, F

OPTICAL RECORDING MEDIUM

BACKGROUND OF THE INVENTION

1. Technical Field

This invention relates to an optical recording medium whose label surface is printable or writable with an ink containing a water-soluble dye.

2. Background Art

Optical recording media, especially optical recording media like recordable compact disks (CD-R) are required to write or print record contents on their surface where media's label is conventionally printed, to be referred to as a label surface, hereinafter. There are some media whose label surface is toughened so as to be writable with a pencil, but such writing can damage the optical recording layer to increase errors. Then such optical recording media favor recording by an ink jet recording system capable of printing without contact with a surface layer to be recorded.

The ink used in the ink jet recording system generally contains water-soluble dyes such as acidic dyes and direct dyes and water solvent as main ingredients and in most cases, further contains small amounts of polyhydric alcohol.

In the prior art, the substrates to be recorded for use in the ink jet recording system are plain paper and substrates having a hydrophilic surface, typically ink jet dedicated special paper having an ink receptive layer. Also many substrates are provided on the surface with a printable layer which is a water-soluble polymer layer formed of starch, gelatin, casein, gum arabic, sodium alginate, carboxymethyl cellulosem polyvinyl alcohol, polyvinyl pyrrolidone, and sodium pclyacrylate, or a layer of a synthetic resin latex such as synthetic rubber latex and an organic solvent-soluble resin such as polyvinyl butyral and polyvinyl chloride. Another proposal is to use polymers having canions. This proposal is intended to prevent redissolving of ink by ionic bonds because many water-soluble dyes for ink jet printing have anions such as sulfonic acid. Known such cationic polymers include, for example, polyvinyl alcohol, polyacrylate and polyacrylamide having a quaternary ammonium salt group (see JP-A 228984/1986, etc.). Use of polyethylene glycol dicarboxylic acid is also proposed for the purpose of improving color (see JP-B 1706/1992).

These water-soluble polymers are highly hydrophilic and thus well compatible with substrates if the substrates used are hydrophilic ones, typically paper. Then no problems arise with respect to adhesion or the like when a printable or writable layer is provided on the substrate surface using such polymers. However, since the water-soluble polymers lack adhesion to substrates having a highly hydrophobic surface as in the case of ultraviolet-cured resins frequently used as protective films for optical recording media, a layer, once applied thereon, will readily strip off or a printable layer itself is less resistant to water so that after printing, ink will be seriously oozed with water droplets, leaving problems on practical use.

If films of ultraviolet-cured resin as used in prior art optical recording media are provided in order to provide substrates having a hydrophobic surface with a printable layer which is relatively free from problems of stripping and water resistance, the films are repellent to ink containing a water-soluble dye and thus unprintable.

Also proposed is a laminated structure wherein a layer which is well adhesive not only to a hydrophobic surface, but to a hydrophilic polymer layer is formed on a substrate having a hydrophobic surface and a hydrophilic polymer layer is formed thereon as a printable layer. This increases the number of steps, resulting in an increased cost.

On the other hand, printable substrates which are used in the ink jet recording system include plain paper and ink jet dedicated special paper which is provided with a porous ink-receptive layer in order that polyhydric alcohol and other less-volatile components in the ink be absorbed and dispersed in the ink-receptive layer to accelrate ink drying and fixing.

Where substrates are hydrophilic and porous as in the case of paper, the substrates by themselves have the function of an ink-receptive layer. However, where substrates are non-porous, a long time is taken for drying and fixing due to less-volatile components in the ink. If any object comes in contact with a printed area before drying, the ink transfers to the object or prints are impaired. Then such substrates are conventionally provided with an ink-receptive layer containing porous particles. The known porous particles used in the ink-receptive layer include inorganic pigment particles such as silica, clay, talc, diatomaceous earth, calcium carbonate, calcium sulfate, barium sulfate, aluminum silicate, synthetic zeolite, alumina, zinc oxide, lithopone, and titanium white (JP-A 228984/1986, JP-B 1706/1992, etc.).

As mentioned above, the substrate surface on the label surface side is typically a protective film of ultraviolet-cured resin which is hydrophobic and has a non-porous surface. An attempt to directly write or print on the label side surface by the ink jet recording system fails because the protective film is repellent to the ink.

Then in order to enable printing by the ink jet recording system, we attempted to provide an ink-receptive lawyer containing porous particles on the protective film. This attempt, however, failed to achieve satisfactory results as printable members because of a low drying rate of ink after printing and poor water resistance of prints.

DISCLOSURE OF THE INVENTION

A first object of the present invention is to provide an optical recording medium having a surface layer which is formed through a single coating step, well adhesive to hydrophobic substrates, and printable with ink containing a water-soluble dye.

A second object of the present invention is to provide an optical recording medium having a surface layer which is printable with ink containing a water-soluble dye and permits printed characters to dry at a high rate and be resistant to water.

These and other objects are achieved by the present invention which is defined below as (1) to (20). Among them, a first embodiment includes (1) to (13) and a second embodiment includes (14) to (20).

(1) An optical recording medium comprising on a substrate an optical recording layer and a surface layer which is printable with an ink containing a water-soluble dye, the surface layer being a cured film of a coating containing a copolymerizable monomer and/or oligomer having at least one carboxyl group.

(2) The optical recording medium of (1) wherein the surface layer contains a polymerization initiator.

(3) The optical recording medium of (1) wherein the printable surface layer contains a crosslinking agent.

(4) The optical recording medium of (1) wherein the monomer or oligomer is at least one member selected from the group consisting of acrylic acid, methacrylic acid, allylacetic acid, allyloxypropionic acid, itaconic acid, maleic acid, allylmalonic acid and derivatives thereof and oligomers thereof.

(5) The optical recording medium of (1) wherein the surface layer is a cured film of a coating containing 20 to 100% by weight of at least one of the monomer and oligomer.
(6) The optical recording medium of (1) wherein the monomer or oligomer contains at least 1% by weight based on the weight of the surface layer of a carboxyl group.
(7) The optical recording medium of (1) further comprising a radiation-cured protective film between the optical recording layer and the surface layer.
(8) The optical recording medium of (1) further comprising a ultraviolet-cured protective film between the optical recording layer and the surface layer.
(9) The optical recording medium of (1) wherein the surface layer further contains porous particles.
(10) The optical recording medium of (9) wherein the porous particles contain smectite.
(11) The optical recording medium of (9) wherein the smectite is a smectite-organic composite.
(12) The optical recording medium of (1) wherein the coated film is cured with ultraviolet radiation.
(13) The optical recording medium of (1) wherein printing is done by an ink jet recording system.
(14) An optical recording medium comprising on a substrate an optical recording layer and a surface layer which is printable with an ink containing a water-soluble dye, the surface layer containing smectite.
(15) The optical recording medium of (14) wherein the surface layer contains 1 to 50% by weight of smectite.
(16) The optical recording medium of (14) wherein the surface layer is a cured film of a coating containing a radiation curable compound and smectite.
(17) The optical recording medium of (14) wherein the smectite is a smectite-organic composite.
(18) The optical recording medium of (14) wherein the surface layer is cured with ultraviolet radiation.
(19) The optical recording medium of (14) wherein the surface layer has a thickness of 1 to 100 μm.
(20) The optical recording medium of (14) wherein printing is done by an ink jet recording system.

FUNCTION

The optical recording medium according to the first embodiment of the invention has a surface layer which is a cured film of a coating containing at least one copolymerizable monomer and/or oligomer having a carboxyl group. This surface layer has higher affinity to a substrate having a hydrophobic surface than conventional printable layers containing water-soluble polymers. By virtue of the anchor effect of the monomer or oligomer component, the surface layer maintains firm adhesion to the hydrophobic surface of the substrate even after curing.

Despite high affinity to a substrate having a hydrophobic surface, the surface layer is printable with an ink containing a water-soluble dye such as ink jet printing ink without raising a practical problem. More preferably, after a copolymerizable monomer and/or oligomer having a carboxyl group is crosslinked, the surface layer is free of swelling and dissolution by water, resistant to water, for example, unsusceptible to a change of film physical properties even in contact with flowing water, and fully stable under high temperature/high humidity conditions so that oozing and leaching of ink are minimized.

Note that JP-B 1706/1992 proposes to add a dicarboxylic acid compound obtained by oxidizing polyethylene glycol at each terminal as a carboxyl group-bearing compound to a substrate or a coating layer on a substrate. A printable member obtained by adding this compound is alleged to exhibit a high resolution of recorded images and high water resistance of recorded images as shown by minimized oozing of ink with water droplets. However, according to the disclosure of this patent reference, an aqueous solution of the dicarboxylic acid is used in introducing the dicarboxylic acid into the substrate or a coating layer on the substrate. Particularly when an aqueous coating solution of the dicarboxylic acid is applied to a substrate having a hydrophobic surface, no improvement in adhesion between the resulting printable layer and the hydrophobic surface of the substrate is expectable.

In the second embodiment of the invention, the surface layer contains smectite. Its unit structure belongs to layer silicates and has as a unit layer a 2:1 structure consisting of two tetragonal sheets having $SiO_4$ tetragonals sharing oxygen apexes extended in a hexagonal network, with the remaining apex oxygen atoms faced each other, and an intervening octagonal sheet of oxygen having cations interposed therein as shown in FIG. 1, the unit layers being stacked. In a solvent, smectite swells and collapses its layer structure, exhibiting a colloidal behavior. Then it has a high ability to adsorb a guest substance and tends to adsorb anions such as sulfonate groups of ink dyes with the aid of cations available therein. It has a significantly improved ink fixing rate and holding ability over conventional porous particles. For this reason, by introducing smectite in the printable surface layer, there is obtained an optical recording medium having a printable surface layer which permits printed characters to dry at a high rate, be resistant to water, and experience no change even in contact with flowing water.

JP-A 60432/1994 discloses an optical information medium (compact disc) having a hydrophilic resin film formed on the label surface side which is printable with aqueous printing ink. It is also disclosed to disperse organic or inorganic pigments in the hydrophilic resin film in order to roughen its surface, but no reference is made to smectite.

ILLUSTRATIVE EMBODIMENTS

Illustrative embodiments of the present invention are now described in detail.

The optical recording medium of the present invention has a surface layer which is printable with an ink containing a water-soluble dye. This surface layer is a cured film of a coating containing one or more copolymerizable monomers or oligomers having at least one carboxyl group.

The surface layer according to the invention is generally applicable to any of substrates used in the ink jet recording system, for example, paper, slide films, overhead projector (OHP) films, and color mosaic filters (CMF). The substrates which can take more advantage of the invention are those having a hydrophobic surface, preferably optical recording media having a radiation-cured protective film, especially such optical recording media as recordable compact discs having a UV-curable protective film. The printable surface layer according to the invention which is generally formed on the label-printing side surface of recordable compact discs having a hydrophobic surface has high affinity and hence, firm adhesion to the hydrophobic surface of the substrate. Then the user can print the contents of optical record on the printable surface layer using an ink containing a water-soluble dye such as ink jet printing ink.

Figure 2:
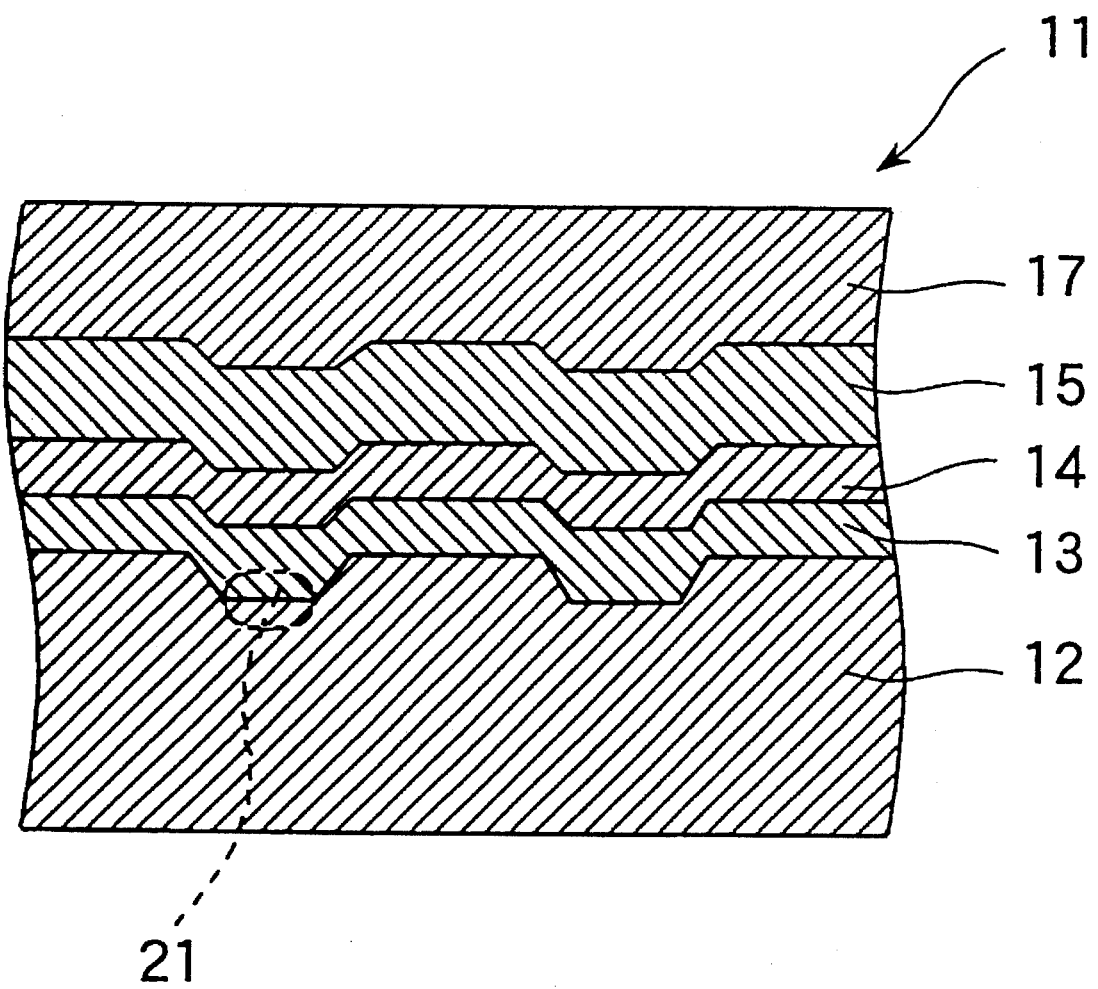
FIG. 2 is a fragmental schematic cross-sectional view of one exemplary optical recording medium according to the present invention.

FIG. 2 shows one exemplary optical recording medium according to the present invention. The optical recording medium 1 shown in FIG. 2 includes a dye-base optical recording layer 13 on a substrate 12, a reflective layer 14 in close contact with the optical recording layer 13, and a protective layer 15 thereon. Further disposed thereon is a surface layer 17. This printable surface layer 17 may be disposed on the protective layer 15 with or without an intervening adhesive layer (not shown) on the protective layer 15. Alternatively, the printable surface layer 17 may serve as the protective film 15.

The UV-cured protective film of optical recording media may be any of protective films generally used in such recordable compact discs and is not critical. For example, it may contain a UV-curable compound such as polyfunctional oligo-ester acrylate and have a thickness of about 0.5 to about 100 μm. The present invention is effective when applied to hydrophobic substrates having a contact angle with water at 25° C. of at least 40°, especially 60° to 90°.

Preferred examples of the copolymerizable monomer and oligomer having at least one carboxyl group include acrylic acid, methacrylic acid, allylacetic acid, allyloxypropionic acid, itaconic acid, maleic acid, allylmalonic acid and derivatives thereof and oligomers thereof.

Among these, monomers and oligomers of acrylic acid, methacrylic acid, allylacetic acid, allyloxypropionic acid and derivatives thereof are more preferred because they are liquid at room temperature and eliminate a need for adding another solvent to prepare a coating solution. It is understood that monomers and oligomers of itaconic acid, maleic acid, allylmalonic acid and derivatives thereof are also advantageously used by using an appropriate solvent to form a coating solution as will be described later.

Exemplary derivatives of acrylic acid and methacrylic acid include acrylic esters, methacrylic esters, acrylamides, and methacrylamides as well as compounds of the following formulae (1) to (3).

Formula (1)

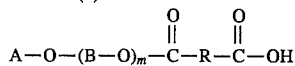

Formula (2)

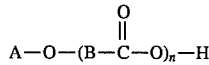

Formula (3):

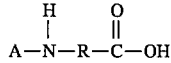

In formulae (1) to (3), A is an acryloyl or methacryloyl group, B is an alkylene group having 2 to 6 carbon atoms ($C_2$–$C_6$, hereinafter) which may have a carboxyl or similar substituent, and R is an alkylene group of $C_2$–$C_6$ which may have a carboxyl or similar substituent, an arylene group such as phenylene, or a heterocyclic group. Letter m is 1 to 5, especially 1 or 2, and n is 1 to 5, especially 1 to 3.

These compounds may be prepared by effecting condensation reaction between a hydroxyalcohol or aminocarboxylic acid and acrylic (or methacrylic) chloride in the presence of triethylamine, for example.

Among the compounds of formula (1), those acrylic derivatives wherein m=1, B and R are an alkylene group having 2 carbon atoms are commercially available as Aronix M-5800 from Toa Synthetic Chemical K. K.

Among the compounds of formula (1), those acrylic derivatives wherein m=1, B is an alkylene group having 2 carbon atoms, and R is a o-phenylene group are commercially available as Aronix M-5400 from Toa Synthetic Chemical K. K.

Among the compounds of formula (2), those acrylic derivatives wherein n=~1 and B is an alkylene group having 2 carbon atoms are commercially available as Aronix M-5600 from Toa Synthetic Chemical K. K.

Among the compounds of formula (2), those acrylic derivatives wherein n=~2 and B is an alkylene group having 2 carbon atoms are commercially available as Aronix M-5300 from Toa Synthetic Chemical K. K.

Especially preferred among these compounds are acrylic acid, methacrylic acid, those compounds having the same structure as commercially available Aronix M-5800, M-5400, etc. as the compounds of formula (1), and those compounds having the same structure as commercially available Aronix M-5300, M-5600, etc. as the compounds of formula (2), as well as allylacetic acid, allyloxypropionic acid, and compounds of the following formulae (a) and (b).

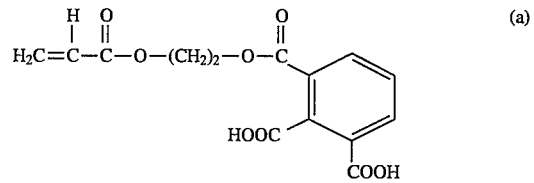

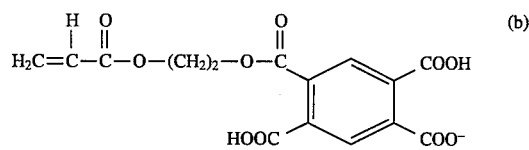

Exemplary derivatives of itaconic acid and maleic acid include itaconic acid monoethyl ester, itaconic acid monomethyl ester, maleic acid monoamide, maleic acid monomethyl ester, and maleic acid monoethyl ester.

At least one of the copolymerizable monomers and oligomers having a carboxyl group is polymerized and cured to form a surface layer, preferably after adding a crosslinking agent, polymerization initiator, porous particles and the like. The content of the polymerized one of at least one of the monomers and oligomers in the printable surface layer is preferably 20 to 100% by weight, more preferably 30 to 95% by weight, most preferably 35 to 85% by weight. A polymer content in this range ensures that the printable surface layer is firmly adhesive to the substrate having a hydrophobic surface and well printable with an ink containing a water-soluble dye. A surface layer with a polymer content below the range would be less adhesive to a substrate having a hydrophobic surface and easily strippable.

The content of carboxyl group in the printable surface layer is preferably at least 1% by weight, more preferably 2 to 60% by weight, most preferably 3 to 30% by weight. A carboxyl content within this range ensures that the surface layer is more effectively printable with ink containing a water-soluble dye. A surface layer with a carboxyl content below the range would be more repellent to ink containing a water-soluble dye and more difficult to write or print.

Preferably the printable surface layer according to the invention contains a polymerization initiator. The polymerization initiator used herein is not critical. However, use of photo-polymerization initiators is preferred because a coating film for the printable surface layer is preferably cured by a technique of irradiating radiation thereto for effecting polymerization and the radiation to be irradiated, which includes electron rays and ultraviolet radiation, is most preferably ultraviolet radiation.

The photo-polymerization initiators are not critical and examples of the initiator which can be used herein include benzoic acid esters, benzophenone derivatives, benzoin derivatives, thioxanthone derivatives, acetophenone derivatives, propiophenone derivatives and benzyl.

Illustrative examples include methyl o-benzoylbenzoate, benzophenone, 4,4-bisdiethylaminobenzophenone, dibenzosuberone, benzoyl alkyl ethers (R=alkyl groups of $C_1-C_8$ which may be branched), 1-phenyl-1,2-propanedione-2-(o-ethoxycarbonyl)oxime, 1-phenyl-1,2-propanedione-2-(o-benzoyl)oxime, 2,2-dimethoxy-2-phenylacetophenone, 2,2-diethoxyacenophenone, chlorinated acetophenone derivatives, 4-isopropyl-2-hydroxy-2-methylpripiophenone, 2-hydroxy-2-methylpropiophenone, 2-hydroxy-2-methyl-1-phenylpropan-1-one, and benzyl. Especially preferred among these polymerization initiators are 2-hydroxy-2-methyl-1-phenylpropan-1-one, 2,2-dimethoxy-2-phenylacetophenone, and methyl o-benzoylbenzoate. Among these preferred polymerization initiators, 2-hydroxy-2-methyl-1-phenylpropan-1-one is commercially available as Darocure 1173 (Merck & Co., Inc.) and 2,2-dimethoxy-2-phenylacetophenone is commercially available as Irgacure 651 (Japan Ciba Geigy K. K.).

The content of polymerization initiator in the surface layer is preferably up to 8% by weight, more preferably 0.2 to 5% by weight, most preferably 0.5 to 3% by weight. With a content below this range, the polymerization initiator would not be fully effective for its purpose. Higher contents would cause coloring, weather yellowing and corrosion.

Also preferably the surface layer according to the invention contains a crosslinking agent. The crosslinking agent used herein is not critical and may be any of acrylate, acrylamide, and vinyl crosslinking agents.

The crosslinking agents used herein include acrylate, acrylamide, and vinyl compounds, for example, acrylamide compounds such as N,N-methylene bisacrylamide, acrylate compounds such as ethylene glycol bis(meth)acrylate, diethylene glycol bis(meth)acrylate, triethylene glycol bis(meth)acrylate, propylene glycol bis(meth)acrylate, 1,4-butanediol bisacrylate, 1,6-hexanediol bisacrylate, pentaerythritol bisacrylate, pentaerythritol triacrylate, and trimethylolpropane triacrylate, and vinyl compounds such as 3,9-divinylspirobi(m-dioxane) and divinyl adipate, with the N,N-methylene bisacrylamide and triethylene glycol bismethacrylate being especially preferred.

The amount of the crosslinking agent added is preferably up to 20% by weight, more preferably 1 to 15% by weight, most preferably 5 to 10% by weight of the surface layer. At a content within this range, the printable surface layer is improved in water resistance to such an extent that film physical properties remain unchanged even in contact with flowing water, prints are improved in water resistance, and appropriate hardness is available. Too much amounts of the crosslinking agent would result in a printable surface layer which is too hard and brittle and low in absorption rate of ink.

Further in the surface layer according to the invention, any of hydrophilic nonionic monomers such as 2-hydroxyethyl methacrylate, acrylamide, N,N-dimethylaminoethyl acrylate, N,N-dimethylaminopropyl acrylamide, acryloylmorpholine, and N-vinylpyrrolidone may be copolymerized. By copolymerizing such a monomer with a component containing at least one of the copolymerizable monomers and oligomers having a carboxyl group, the printable surface layer as cured becomes less sticky on the surface.

The amount of the hydrophilic nonionic monomer added is preferably up to 50% by weight, more preferably up to 40% by weight of the surface layer. Too much addition amounts would lower the absorption rate of ink containing a water-soluble dye and adhesion to the substrate.

Further preferably, the surface layer according to the invention contains porous particles in order to allow only the solvent to quickly penetrate over a wide region without allowing the dye to diffuse, to improve the function as an ink receptive layer, and to accelerate drying. The porous particles used herein may be any one of porous particles commonly used for such purposes. Examples of the porous particles include inorganic pigments such as silica, clay, talc, diatomaceous earth, calcium carbonate, calcium sulfate, barium sulfate, aluminum silicate, synthetic zeolite, alumina, zinc oxide, lithopone, and titanium white.

These porous particles preferably have a mean particle size of 0.2 to 20 μm, more preferably 0.5 to 10 μm. With a too large mean particle size, a film would be brittle or rough on the surface. With a too small mean particle size, solvent penetration would be slow.

Since these porous particles can render the surface layer white turbid when added in certain amounts, the amount of porous particles added may be determined depending on an application and purpose. Larger amounts would enhance the ink diffusion effect, but render the printable surface layer brittle and less durable. The addition amount is preferably up to 50% by weight, more preferably up to 40% by weight.

Figure 1:
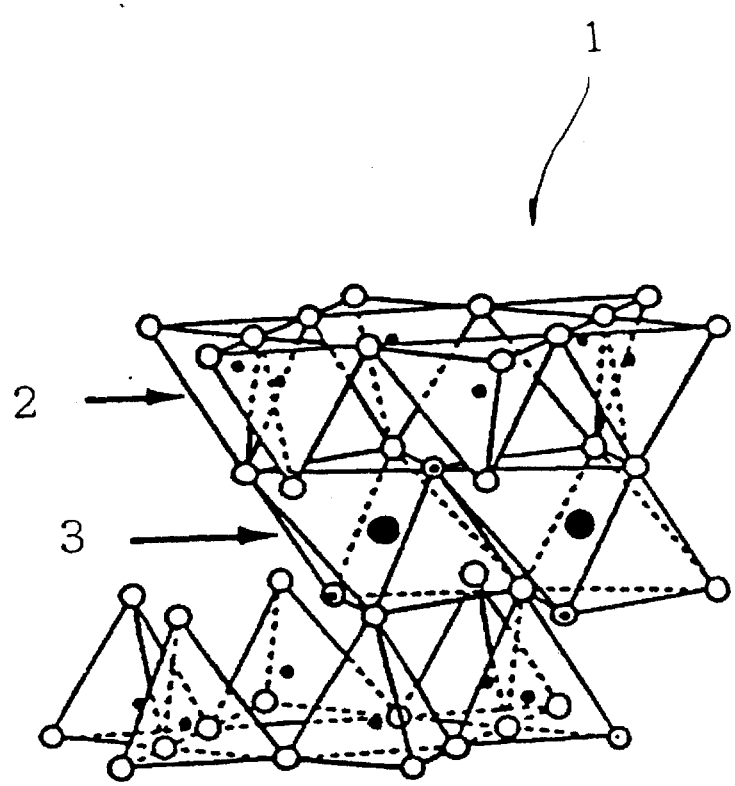
FIG. 1 illustrates one exemplary unit structure of elements constituting smectite used in the present invention.

It is preferred to use smectite as the porous particles. The smectite has a unit structure which belongs to layer silicates and basically has as a unit layer a 2:1 structure consisting of two tetragonal sheets having $SiO_4$ tetragonals sharing oxygen apexes extended in a hexagonal network, with the remaining apex oxygen atoms faced each other, and an intervening octagonal sheet of oxygen having cations interposed therein as shown in FIG. 1, the unit layers being stacked.

When such porous particles are introduced into the surface layer according to the invention, the porous particles preferably contain smectite which is effective for improving the viscosity of a coating solution.

Since the copolymerizable monomer and oligomer having at least one carboxyl group used in the surface layer according to the invention have a low molecular weight, a coating solution containing the same has a low viscosity. Then the technique of applying this coating solution to a substrate is limited. By increasing the viscosity of the coating solution, an improvement in coating ability is expectable and a choice of coating technique from a wider range is ensured.

The smectite used herein is preferably a smectite-organic composite (to be referred to as lipophilic smectite).

Smectite is one of silicates having a layer structure and natural and industrially synthesized ones are available. Either of natural and synthesized products may be used in the practice of the invention. Industrially synthesized products are preferred in view of its properties in solvent and impurity-free.

As the industrially synthesized product, synthetic smectites are commercially available. The commercially available synthetic smectites include hydrophilic smectites which swell in water and collapse their layer structure to be colloidal to exhibit viscosity and lipophilic smectites which become colloidal in organic solvents to exhibit viscosity.

The lipophilic smectites are smectites in which Na ions in the layer structure of hydrophilic smectites are replaced by organic ions capable of solvation with low polar solvents and highly polar solvents. Some illustrative, non-limiting examples of the organic ions include quaternary ammonium having alkyl groups with 1 to about 10 carbon atoms, such as tetramethyl ammonium and tetraethyl ammonium.

A choice of a suitable organic ion for substitution can provide the smectite with an ability to effectively disperse in various organic solvents to exhibit colloidal or viscous properties and to intercalate guest substances such as ink or its solvent. As a result, an ink receptive layer having a higher drying rate of prints is obtained. These lipophilic smectites are commercially available as SAN, STN, SEN and SPN from Corp Chemical K. K.

Such smectite has an ability to swell in a solvent to become colloidal to increase the viscosity of solution. Then containment of smectite enables to adjust the viscosity of a coating solution to form a printable surface layer, which enlarges the range of choice of a coating technique. Lipophilic smectite exhibits pseudo-plastic viscosity and a coefficient of viscosity largely varies with the grade of lipophilic smectite, the solvent used, a shear rate during measurement and the like. The type and amount of smectite used may be empirically determined in accordance with the type and desired viscosity of coating solution.

Preferably smectite used herein has a specific surface area of 500 to 1,000 $m^2/g$, more preferably 710 to 800 $m^2/g$. Within this range, smectite is effective for increasing viscosity in organic solvent and offers advantages of an ink receptive layer. A smaller specific surface area would offer less advantages of an ink receptive layer. A larger specific surface area gives rise to no problem, but no smectite having a specific surface area beyond the range is generally available.

When a surface of a printable surface layer is observed under an optical microscope, smectite is seen as particles of irregular shape having an average major diameter of preferably 0.1 to 100 μm, more preferably 0.5 to 50 μm, most preferably 1 to 45 μm. A too larger average major diameter would render a film brittle or rough on a surface. A too smaller average major diameter would lead to a low rate of solvent penetration and a low drying rate of prints.

The content of smectite contained is preferably up to 50% by weight, more preferably up to 40% by weight. Too much contents would render a printable surface layer brittle and less durable.

Where a mixture of two or more types of porous particles is used as the porous particles, the total content of porous particles should preferably be up to 50% by weight. Where a mixture of two or more types of porous particles including smectite is used, the content of smectite may be determined by taking into account the advantages as an ink receptive layer and the viscosity of coating solution.

To the printable surface layer according to the invention, there may be added photo-polymerization promoters such as triethanol amine and 2-(dimethylamino)ethyl benzoate, chain transfer agents, radical polymerization inhibitors such as phenothiazine, and stabilizers such as chelating agents like N-nitrosophenylhydroxylamine aluminum salt.

The method of forming a printable surface layer on a substrate according to the invention involves preparing a coating solution having the desirable composition mentioned above and applying the coating solution to a substrate.

The coating technique may be any of commonly used techniques including spin coating, spray coating, dipping, gravure roll, knife coater, reverse roll, screen printing and bar coater techniques. Particularly when a coating solution which is adjusted to an appropriate viscosity by adding lipophilic smectite is used, it can be effectively coated by a screen printing, gravure roll or bar coater technique. The thus coated film may be cured by exposure to radiation. The radiation used herein is preferably ultraviolet radiation as previously mentioned.

Also where itaconic acid, maleic acid, allylmalonic acid and derivatives thereof which are solid at room temperature are used as the monomer and oligomer, coating solutions may be prepared using organic solvents.

The preferred solvents used herein include ethanol, butylcarbinol, and ethyl cellosolve. A mixture of two or more such solvents may also be used. The type and content of solvent used in the coating solution or the mixing ratio of solvents is not critical and may be properly determined by taking into account the composition of coating solution as well as the preparation and application techniques.

It is to be noted that where a solvent is used in the coating solution, the coating solution is applied to a substrate by an appropriate technique as mentioned above and thereafter, the coating is dried to remove the solvent and cured by exposure to radiation.

The thus formed surface layer preferably has a thickness of 1 to 100 μm, more preferably 5 to 50 μm. If it is too thick, the substrate to be printed would be warped or curing would be short. If it is too thin, solvent penetration would be less and drying of printed ink would be short.

Also the surface layer has a contact angle with water at 25° C. of preferably up to 60°, more preferably up to 40°. with a contact angle within the range, the printable surface layer is firmly adhesive to a hydrophobic substrate and printable with ink containing a water-soluble dye. A layer with a larger contact angle would be difficult to print with ink containing a water-soluble dye.

The optical recording medium having a surface layer formed in the above-mentioned way according to the present invention is preferably printed by means of a printing equipment of the ink jet recording system. It is understood that the record printing may be writing with a pen filled with water-soluble ink.

The ink used herein is not critical insofar as it is an ink containing a water-soluble dye. Any of inks used in printing equipment of the ink jet recording system may be employed.

In the second embodiment, the surface layer 17 used may be formed of any of conventional well-known printable materials commonly used with the ink jet recording system and contains smectite.

Exemplary printable materials are hydrophilic printable surface layers including layers of water-soluble polymers such as starch, gelatin, casein, gum arabic, sodium alginate, carboxymethyl cellulose, polyvinyl alcohol, polyvinyl pyrrolidone, and sodium polyacrylate; layers of synthetic resin latex such as synthetic rubber latex and organic solvent-soluble resins such as polyvinyl butyral and polyvinyl chloride; polymers having cations such as polyvinyl alcohol, polyacrylates, and polyacrylamides having a quaternary ammonium salt group (see JP-A 228984/1986); and polyethylene glycol dicarboxylic acid (see JP-B 1706/1992).

Where such a hydrophilic printable surface layer 17 is used, the smectite combined therewith is preferably hydrophilic smectite to be describe later.

With such a printable surface layer 17 used, in order to improve its adhesion to a protective layer 15 obtained by curing a coating film of a radiation-curable compound, an adhesive layer is preferably formed between the protective layer 15 and the printable surface layer 17. The adhesive layer may be any of well-known adhesives as long as it is well adhesive to both the protective layer and the hydrophilic printable surface layer.

Any of well-known methods may be used in forming the hydrophilic printable surface layer 17 and adhesive layer.

However, the hydrophilic printable surface layer 17 as such is likely to be poor in water resistance of itself and water resistance of prints. Therefore, the printable surface layer 17 should preferably contain a radiation-curable compound to be described later and smectite.

Where the printable surface layer 17 is a cured one of a coating film containing a radiation-curable compound and smectite, it may also serve as the protective layer 15 or be separately formed on the protective layer 15. Further an adhesive layer may be provided between the printable surface layer 17 and the protective layer 15. From the standpoint of manufacture cost, however, the printable surface layer 17 also serving as the protective layer 15 or the printable surface layer 17 on the protective layer 15 is preferred.

Where the printable surface layer 17 contains a radiation-curable compound, the smectite used in combination is preferably a smectite-organic composite (to be referred to as lipophilic smectite, hereinafter) which is well dispersible in a coating film containing the radiation-curable compound.

Useful smectites include hydrophilic smectites which swell in water and collapse their layer structure to be colloidal to exhibit viscosity and lipophilic smectites which become colloidal in organic solvents to exhibit viscosity. Among the hydrophilic type, hydrophilic smectite is commercially available as SWN form Corp Chemical K. K.

The lipophilic smectite is a smectite in which Na ions in the layer structure of hydrophilic smectite are replaced by organic ions capable of solvation with low polar solvents and highly polar solvents. Some illustrative, non-limiting examples of the organic ions include quaternary ammonium having alkyl groups with 1 to about 10 carbon atoms, such as tetramethyl ammonium and tetraethyl ammonium.

A choice of a suitable organic ion for substitution can provide the smectite with an ability to effectively disperse in various organic solvents to exhibit colloidal or viscous properties and to intercalate guest substances such as ink or its solvent. These lipophilic smectites are commercially available as SAN, STN, SEN and SPN from Corp Chemical K. K.

Whether it is hydrophilic or lipophilic, such smectite has an ability to swell in a solvent to become colloidal to increase the viscosity of solution. Then containment of smectite enables to adjust the viscosity of a coating solution to form a printable surface layer 17, which enlarges the range of choice of a coating technique.

More illustratively, those coating solutions which are otherwise not applicable because of too low viscosity can be applied by common coating techniques such as screen printing, gravure roll and bar coater techniques.

The content of smectite contained is preferably 1 to 50% by weight, more preferably 3 to 45% by weight, most preferably 5 to 40% by weight of the printable surface layer 17. Smectite contents within this range lead to a printable surface layer 17 which is printable with ink containing a water-soluble dye, offers a higher drying rate of prints, and ensures higher water resistance of prints because the ink dye is intercalated within smectite and firmly bound therein.

Too much contents of smectite would render a printable surface layer swellable, brittle and less durable. Another disadvantage is that the coating solution has a too high viscosity to apply uniformly. Too low contents of smectite would lead to difficult printing with ink containing a water-soluble dye, a lower drying rate of prints, and poor water resistance of prints.

Preferably smectite used herein has a specific surface area of 200 to 1,000 $m^2/g$, more preferably 500 to 1,000 $m^2/g$, most preferably 710 to 800 $m^2/g$. Within this range, advantages of an ink receptive layer are available. A smaller specific surface area would offer less advantages of an ink receptive layer. A larger specific surface area gives rise to no problem, but no smectite having a specific surface area beyond the range is generally available.

When a surface of the surface layer 17 is observed under an optical microscope, smectite is seen as particles of irregular shape having an average major diameter of preferably 0.1 to 100 μm, more preferably 0.5 to 50 μm, most preferably 1 to 45 μm. A too larger average major diameter would render a film brittle or rough on a surface. A too smaller average major diameter would lead to a low rate of solvent penetration and a low drying rate of prints.

In addition to the smectite, the surface layer 17 of the optical recording medium 1 according to the invention may contain any one of commonly used porous particles, for example, inorganic pigment particles such as silica, clay, talc, diatomaceous earth, calcium carbonate, calcium sulfate, barium sulfate, aluminum silicate, synthetic zeolite, alumina, zinc oxide, lithopone, and titanium white.

The radiation-curable compounds include monomers, oligomers and polymers having contained or introduced in their molecule a group capable of crosslinking or polymerization upon exposure to radiation, for example, such as an acrylic double bond as in acrylic acid, methacrylic acid or esters thereof having an unsaturated double bond which is sensitive to ionization energy and radical polymerizable, an allyl double bond as in diallyl phthalate, and an unsaturated double bond as in maleic acid and maleic acid derivatives. They may be used alone or in admixture.

The preferred radiation-curable monomers are compounds having a molecular weight of less than 2,000 and preferred oligomers are those having a molecular weight of 2,000 to 10,000. Examples include styrene, ethyl acrylate, ethylene glycol diacrylate, ethylene glycol dimethacrylate, diethylene glycol diacrylate, diethylene glycol methacrylate, 1,6-hexane glycol diacrylate, and 1,6-hexane glycol dimethacrylate. Especially preferred are pentaerythritol tetraacrylate (or methacrylate), pentaerythritol acrylate (or methacrylate), trimethylolpropane triacrylate (or methacrylate), trimethylolpropane diacrylate (or methacrylate), acryl-modified products of urethane elastomers, those compounds having a functional group such as COOH introduced therein, acrylates (or methacrylates) of phenol ethylene oxide adducts, compounds wherein an acryl (or methacryl) group or s-caprolactone-acryl group is attached to a pentaerythritol condensed ring as disclosed in Japanese Patent Application No. 072888/1987, and acryl group-bearing monomers and/or oligomers such as special acrylates as disclosed in Japanese Patent Application No. 072888/1987. Other useful radiation-curable oligomers include acryl modified products of oligo-ester acrylates and urethane elastomers, and those products having a functional group such as COOH introduced therein.

The oligo-ester acrylates are oligo-ester compounds having a plurality of acrylate or methacrylate groups. Preferred oligo-ester acrylates have a molecular weight of 1,000 to 10,000, more preferably 2,000 to 7,000 and a degree of polymerization of 2 to 10, more preferably 3 to 5. Preferred among others are those polyfunctional oligo-ester acrylates having 2 to 6, especially 3 to 6 acrylate or methacrylate groups.

The polyfunctional oligo-ester acrylates used herein are commercially available as Aronix M-7100, M-8030, M-8060, M-8100, M-9050, M-6100, M-6200, M-6250, M-6300, M-6400, and M-6500 from Toa Synthetic Chemical K. K. They are represented by the following formulae (4) and (5).

Formula (4):
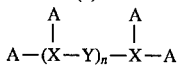

Formula (5):
A—(M—N)$_n$—M—A

A: acrylate or methacrylate group
X: polyhydric alcohol (e.g., glycerol) residue
Y: polybasic acid (e.g., citric acid) residue
M: dihydric alcohol (e.g., ethylene glycol, diethylene glycol, 1,6-hexane glycol, and bisphenol-A) residue
N: dibasic acid (e.g., terephthalic acid, isophthalic acid, adipic acid, and succinic acid) residue
n: 1 to 10, preferably 2 to 5

Those acrylates of formula (1) are preferred among these.

Other useful oligo-ester acrylates are monofunctional ones represented by the following formulae (c) to (e) or (x). The acrylates of formulae (c), (d), (e), and (x) are commercially available as Aronix M-5300, Aronix M-5400, Aronix M-5600, and Aronix M-5700, respectively.

Formula (c):
CH$_2$=CHCOO—(C$_5$H$_{10}$COO)$_n$—H    (n~2)

Formula (d):
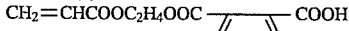

Formula (e):
CH$_2$=CHCOO—(CH$_2$—CH$_2$—COO)$_n$—H    (n~1)

Formula (f):
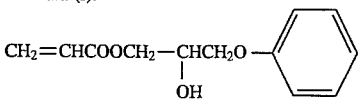

In addition to or instead of the above-mentioned compounds, radiation-curable compounds obtained by modifying thermoplastic resins to be sensitive to radiation may also be used. Examples of such radiation-curable resins include thermoplastic resins having contained or introduced in their molecule a group capable of crosslinking or polymerization upon exposure to radiation, for example, such as an acrylic double bond as in acrylic acid, methacrylic acid or esters thereof having an unsaturated double bond which is radical polymerizable, an allyl double bond as in diallyl phthalate, and an unsaturated bond as in maleic acid and maleic acid derivatives. Examples of the thermoplastic resin which can be modified into a radiation-curable resin include vinyl chloride copolymers, saturated polyester resins, polyvinyl alcohol resins, epoxy resins, phenoxy resins, and cellulose derivatives. Other resins which can be modified to be radiation-sensitive include polyfunctional polyester resins, polyether ester resins, polyvinyl pyrrolidone resins and derivatives (PVP olefin copolymers), polyamide resins, polyimide resins, phenol resins, spiro-acetal resins, and acrylic resins containing at least one acrylate or methacrylate having a hydroxyl group as a polymerizable component.

Ultraviolet radiation and electron radiation are exemplary of the radiation which is irradiated for curing coating films containing such radiation-curable compounds, with the use of UV radiation being preferred. Where UV radiation is used, photo-polymerization initiators are preferably contained in the radiation-curable compounds. The photo-polymerization initiators used herein are not critical and include benzoic acid esters, benzophenone derivatives, benzoin derivatives, thioxanthane derivatives, acetophenone derivatives, propiophenone derivatives, and benzyl.

The content of photo-polymerization initiator in the surface layer is preferably up to 8% by weight, more preferably 0.2 to 5% by weight, most preferably 0.5 to 3% by weight of the surface layer excluding smectite and optional porous particles other tan smectite. With lower contents below the range, the photo-polymerization initiator would not fully exert its function whereas higher contents would cause coloring, weather yellowing, and corrosion.

Further in the printable surface layer 17 according to the invention, there may be copolymerized any of hydrophilic nonionic monomers such as 2-hydroxyethyl methacrylate, acrylamide, N,N-dimethylaminoethyl acrylate, N,N-dimethylaminopropyl acrylamide, acryloylmorpholine, N-vinylpyrrolidone, and polyethylene glycol monomethacrylate of the following formula (y).

Formula (y):
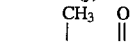
H$_2$C=C——C—O—(CH$_2$CH$_2$O)$_n$—H    (n = 7 to 9)

Another preferred composition containing a radiation-curable compound of which the surface layer is formed is a composition containing an epoxy resin and a cationic photopolymerization catalyst.

The epoxy resins used herein are preferably alicyclic epoxy resins, especially those having at least two epoxy groups in a molecule. Examples of the alicyclic epoxy resin include 3,4-epoxycyclohexylmethyl-3,4-epoxycyclohexanecarboxylate, bis(3,4-epoxycyclohexylmethyl) adipate, bis-(3,4-epoxycyclohexyl) adipate, 2-(3,4-epoxycyclohexyl-5,5-spiro-3,4-epoxycyclohexane-meta-dioxane, bis(2,3-epoxycyclopentyl) ether, and vinylcyclohexene dioxide. The alicyclic epoxy resin preferably has an epoxy equivalent of 60 to 300, especially 100 to 200 for better curing though not limited thereto.

Any of well-known cationic photo-polymerization catalysts may be used without particular limitation. Examples include metal fluoroborate salts, boron trifluoride complexes, bis(perfluoroalkyl sulfonyl)methane metal salts, aryldiazonium compounds, aromatic onium salts of Group 6A elements, aromatic onium salts of Group 5A elements, dicarbonyl chelates of Group 3A to 5A elements, thiopyrilium salts, Group 6A elements having a MF6 anion wherein M is P, As or Sb, triarylsulfonium complex salts, aromatic iodonium complex salts, and aromatic sulfonium complex salts, with the polyarylsulfonium complex salts, aromatic sulfonium and iodonium complex salts of halogen-containing complex ions, and aromatic onium salts of Group 3A, 5A and 6A elements being preferred.

Also useful are cationic photo-polymerization catalysts containing an organometallic compound and a photodecomposable organic silicon compound. The organometallic compounds include complex compounds having alkoxy, phenoxy, β-diketonato and other groups coordinated to a metal atom such as Ti, V, Cr, Mn, Fe, Co, Ni, Cu, Zn, Al and Zr. Preferred among these are organic aluminum compounds, for example, trismethoxy aluminum, trispropionato aluminum, tristrifluoroacetyl aluminum, and trisethylacetoacetonato aluminum.

The photo-decomposable organic silicon compounds yield silanol upon exposure to light such as ultraviolet radiation and include silicon compounds having a peroxysilano, o-nitrobenzyl or α-ketosilyl group.

Preferably the composition contains about 0.05 to 0.7 part, especially about 0.1 to 0.5 part by weight of the cationic photo-polymerization catalyst per 100 parts by weight of the epoxy resin.

More preferably, a composition containing an acryl-containing compound as a radiation curable compound and a photo-polymerization initiator or sensitizer is coated and cured with radiation, typically UV radiation.

The method of forming a printable surface layer 17 containing a radiation-curable compound and smectite which is preferred for use in the optical recording medium according to the invention involves preparing a coating solution containing a radiation-curable compound and smectite, applying the coating solution onto a reflecting layer 14 or protective film 15 by any well-known coating technique, and irradiating radiation, preferably UV radiation for curing by any well-known technique using a conventional radiation source such as a mercury lamp.

The coating technique may be any of commonly used techniques including spin coating, spray coating, dipping, gravure roll, knife coater, reverse roll, screen printing and bar coater techniques. Particularly when a coating solution which is adjusted to an appropriate viscosity by adding smectite is used, it can be effectively coated by a screen printing, gravure roll or bar coater technique.

The thus formed surface layer 17 preferably has a thickness of 1 to 100 μm, more preferably 5 to 80 μm, most preferably 10 to 50 μm. It is noted that where a film serving as both the printable surface layer 17 and protective film 15 is used, the film thickness is preferably 1 to 100 μm, more preferably 10 to 100 μm, most preferably 30 to 80 μm. With a film thickness in this range, the printable surface layer 17 of the optical recording medium according to the invention becomes effective, offers a very high drying rate of prints and enhances the water resistance of prints. If the film is too thick beyond the range, the disc can be distorted due to shrinkage during curing. If the film is too thin, the advantages associated with the drying rate and water resistance of prints according to the invention would become insufficient.

The substrate 12 is formed of a resin or glass material which is substantially transparent (preferably a transmittance of at least 88%) to recording and reading light, typically a semiconductor laser beam having a wavelength of about 600 to 900 nm, especially about 770 to 900 nm, most often 780 nm. Then recording and reading operation can be made from the rear surface of the substrate.

Preferably, resins are used as the substrate material, with preferred examples including thermoplastic resins such as polycarbonate resins, acrylic resins, amorphous polyolefins, and TPX. The substrate 12 may be prepared by conventional techniques such as injection molding. At this point, a predetermined pattern, typically a Groove 21 is preferably formed in the substrate surface for tracking and addressing purposes. It is noted that after the substrate 12 is prepared, a resin layer having a predetermined pattern including grooves may be formed thereon by 2P (photopolymerization) method of the like.

The recording layer 13 may contain only one dye or a mixture of compatible dyes.

No particular limit is imposed on the light absorbing dye used in the recording layer 13 as long as it has maximum absorption at a wavelength in the range of from 600 to 900 nm, more preferably from 600 to 800 nm, most preferably from 650 to 750 nm. Such a light absorbing dye is preferably selected from cyanine dyes, phthalocyanine dyes, naphthalocyanine dyes, anthraquinone dyes, azo dyes, triphenylmethane dyes, pyrylium dyes, thiapyrylium dyes, squalirium dyes, chroconium dyes, and metal complex dyes alone or in admixture of two or more.

A quencher may be mixed with the light absorbing dye. Alternatively, an ionic combination or ionically bonded compound of a dye cation and a quencher anion is a useful light absorbing dye.

Preferred quenchers used herein are metal complexes of acetylacetonates, bisdithiols such as bis(dithio-α-diketones) and bisphenyldithiols, thiocatechols, salicylaldehydeoximes, and thiobisphenolates. Also useful are amine quenchers such as amine compounds having a nitrogenous radical cation-and hindered amines.

For the ionically bonded dye combination, cyanine dyes having indolenine rings and metal complex quenchers such as bisphenyldithiol metal complexes are preferred.

The recording layer 13 is formed by spin coating, more particularly by dissolving the dye in a suitable organic solvent to form a coating solution and applying and spreading the coating solution on a rotating substrate.

The organic solvent used in preparing a coating solution for the recording layer may be selected in accordance with a particular dye used from alcohols, ketones, esters, ethers, aromatics, and alkyl halides, with organic solvents having two or more functional groups in a molecule being preferred. The coating is dried after spin coating, if desired.

Preferably, the recording layer 13 thus formed has a thickness of about 1,000 to about 3,000 Å although the exact thickness depends on the reflectivity or the like.

On the recording layer 13, the reflective layer 14 is formed in direct close contact. The reflective layer 14 is formed of a high reflectivity material. Such preferred materials are Au, Cu, Ag, Al and alloys thereof. It is preferred that the reflective layer 14 contain an least Cu because copper is relatively inexpensive and has high reflectivity. It is especially preferred to use as the reflective layer a thin film containing Cu and at least one element selected from the group consisting of Ti, V, Ta, Cr, Mo, W, Mn, Fe, Co, Rh, Ni, Pd, Pt, Ag, Au, Al, N and O.

It is further preferred that the reflective layer 14 is formed of a thin film containing Cu and at least one element selected from the group consisting of Ti, V, Ta, Cr, Mo, W, Mn, Fe, Co, Rh, Ni, Pd, Pt, AQ, Au, and Al, especially a thin film containing Cu and at least one element selected from the group consisting of Rh, Ni, Pd, Pt, Ag, Au, and Al, because higher reflectivity is obtained while maintaining sufficiently high corrosion resistance.

The reflective layer 14 may be formed by various vapor phase deposition techniques such as sputtering and evaporation.

The reflective layer 14 preferably has a thickness of at least 500 Å. No upper limit is imposed on the thickness although it should preferably be up to about 1,700 Å from the standpoints of cost and operational time.

On the reflective layer 14 is formed the protective layer 15. It is understood that where a film serving as both the printable surface layer 17 and protective layer 15 is used, the printable surface layer 17 is formed on the reflective layer 14.

Where the protective film 15 is provided separately from the printable surface layer 17, the radiation-curable compounds and photo-polymerization initiators preferably used in the printable surface layer 17 may also be used for the protective film 15. In this regard, the radiation-curable compound used in the printable surface layer 17 and the radiation-curable compound used in the protective film 15 may be identical or different. The techniques of forming and curing the protective film 15 are the same as the printable surface layer 17.

Where the protective film 15 is provided separately from the printable surface layer 17, the protective film 15 preferably has a thickness of 1 to 100 μm, more preferably 10 to 50 μm. If a film is too thin below the range, it would provide insufficient protection so that frequent errors might occur in record signals. If a film is too thick, the recording medium would be warped or the protective film would be cracked due to shrinkage during curing of a resin film.

To the protective film 15 and printable surface layer 17 provided in the optical recording medium according to the invention, there may be added photo-polymerization promoters such as triethanol amine and 2-(dimethylamino)ethyl benzoate, chain transfer agents, radical polymerization inhibitors such as phenothiazine, and stabilizers such as chelates including N-nitrosophenylhydroxylamine aluminum salt.

The optical recording medium having a printable surface layer 17 formed in the above-mentioned way is preferably printed by means of a writing equipment of the ink jet recording system while writing is possible with a pen filled with ink containing a water-soluble dye, but at the risk of increased errors.

The ink used herein is not critical as long as it contains a water-soluble dye. Any of inks suitable for use in writing equipment of the ink jet recording system may be used.

EXAMPLE

Examples of the present invention are given below by way of illustration.

Example 1

The substrate used was a recordable compact disc (CD-R) having a protective film of UV-cured resin which was obtained by applying a coating composition consisting of 97 parts by weight of a polyfunctional oligo-ester acrylate having a structure of the following formula (z) (Aronix M-8100, Toa Synthetic Chemical K. K.) and 3 parts by weight of 2-hydroxy-2-methyl-1-phenylpropan-1-one (Darocure 1173, Merck & Co., Inc.) and irradiating UV radiation thereto for curing by a UV irradiating device. A coating film was formed by spin coating a coating solution of the following composition and cured by irradiating UV radiation of 160 W/cm for 60 sec. by a UV irradiating device Model UVM-602 (Ushio Electric K. K.) at a distance of 230 mm, obtaining a printable surface layer. The protective film had a contact angle of 72° with water at 25° C. The printable surface layer had a thickness of 30 μm, a carboxyl content of 29% by weight, and a contact angle of 13° with water at 25° C.

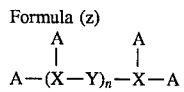

Formula (z)

In formula (z), A is acrylic acid, X is a polyhydric alcohol (e.g., glycerol), and Y is a polybasic acid (e.g., adipic acid and terephthalic acid).

| Coating solution composition | |
|---|---|
| Acrylic acid | 3 pbw |
| Triethylene glycol bismethacrylate (crosslinking agent) | 0.5 pbw |
| 2-hydroxyethyl methacrylate | 3 pbw |
| Polymerization initiator (Irgacure 651, Japan Ciba Geigy K.K.) | 0.1 pbw |

The resulting printable member was evaluated by the following method. Setting was carried out for evaluation by the ink jet recording system using ink of the following composition.

| Ink composition | |
|---|---|
| C.I. Direct Black 19 | 2 pbw |
| Diethylene glycol | 30 pbw |
| Water | 70 pbw |

The printable surface layer was evaluated in terms of (1) adhesion to the substrate, (2) ink repellency, (3) drying time of printed characters, (4) ink oozing, and (5) water resistance of printed characters.

Evaluation was made by the following methods.

(1) Adhesion

By using Scotch Clear Tape 600 by 3M, applying it to the printable surface layer over an adhesive area of 1.2 cm ×1.0 cm and peeling it, the printable surface layer was rated "0" when no stripping occurred and "X" when stripping occurred.

(2) Ink Repellency

Characters were printed before it was determined whether or not ink was repelled. The printable surface layer was rated "0" when characters were properly printed without ink repellency and "X" when ink was repelled to hinder normal setting. Note that the ink repellency to hinder normal setting occurs when the contact angle of the printable surface layer with ink at 25° C. exceeds 60°.

(3) Drying Time of Printed Characters

The drying time is a time taken from setting until the printed ink becomes tack-free to fingers touching the printed surface. It was rated "⊚" when the drying time was up to 30 seconds, "O" when the drying time was from more than 30 seconds to 1 minute, "Δ" when the drying time was more than 1 minute, and "X" when ink remained wet over 24 hours.

(4) Ink Oozing

Characters were printed and dried before the printed characters were visually inspected. Ratings were "O" when no oozing of printed characters was found, "Δ" when slight oozing of printed characters was found, and "X" when oozing of printed characters was apparent.

(5) Water Resistance of Printed Characters

Characters were printed and dried before the printed surface layer was placed in flowing water for 1 minute. Through visual inspection, ratings were "⊚" when no oozing of printed characters was found, "O" when slight oozing of printed characters was found, "Δ" when oozing of printed characters was apparent, and "X" when printed characters disappeared.

The results of evaluation are shown in Table 1.

Example 2

A printable member having a printable surface layer was prepared by the same procedure as in Example 1 except that the coating solution was changed as described below. The printable surface layer had a thickness of 30 μm and a carboxyl content of 23.4% by weight, and the contact angle of the printable surface layer with water at 25° C. was unmeasurable because of a high rate of water absorption into the layer.

| Coating solution composition | |
|---|---|
| Acrylic acid | 3 pbw |
| N,N-methylenebisacrylamide (crosslinking agent) | 1 pbw |
| Acryloylmorpholine | 2 pbw |
| Porous silica (mean particle size 2 μm) | 2 pbw |
| Polymerization initiator (Irgacure 651, Japan Ciba Geigy K.K.) | 0.2 pbw |

The printable member was evaluated for the same items as in Example 1. The results are also shown in Table 1.

Example 3

A printable member was prepared by the same procedure as in Example 1 except than the coating solution was changed as described below and a coating film was formed by a screen printing technique. The printable surface layer had a thickness of 40 μm and a carboxyl content of about 3% by weight, and the contact angle of the printable surface layer with water at 25° C. was unmeasurable because of a high rate of water absorption into the layer.

| Coating solution composition | |
|---|---|
| Acrylic acid derivative (Aronix M-5300, Toa Synthetic Chemical K.K.) | 4 pbw |
| Triethylene glycol bismethacrylate (crosslinking agent) | 0.5 pbw |
| Smectite (SAN, Corp Chemical K.K., $S_{BET}$ 710–760 m²/g) | 2 pbw |
| Polymerization initiator (Irgacure 651, Japan Ciba Geigy K.K.) | 0.1 pbw |

The printable member was evaluated for the same items as in Example 1. The results are also shown in Table 1.

Example 4

A printable member having a printable surface layer was prepared by the same procedure as in Example 1 except that the coating solution was changed as described below. The printable surface layer had a thickness of 30 μm and a carboxyl content of 10.6% by weight, and the contact angle of the printable surface layer with water at 25° C. was unmeasurable because of a high raze of water absorption into the layer.

| Coating solution composition | |
|---|---|
| Acrylic acid derivative (Aronix M-5400, Toa Synthetic Chemical K.K) | 5 pbw |
| 2-hydroxyethyl methacrylate | 1 pbw |
| Porous silica (mean particle size 2 μm) | 2 pbw |
| Polymerization initiator (Irgacure 651, Japan Ciba Geigy K.K.) | 0.1 pbw |

The printable member was evaluated for the same items as in Example 1. The results are also shown in Table 1.

Comparative Example 1

A printable member was prepared by using the same substrate as in Example 1 and a coating solution of the following composition, forming a coating film by a screen printing technique, and drying in a dryer at 80° C. for one hour. The printable surface layer had a thickness of 30 μm, a carboxyl content of 0.02% by weight, and a contact angle of 24° with water at 25° C.

| Coating solution composition | |
|---|---|
| Polyethylene glycol dicarboxylic acid (molecular weight ˜3,500, PEO acid #4000, Kawaken Fine Chemical K.K.) | 1 pbw |
| Polyvinyl alcohol | 50 pbw |
| Porous silica (mean particle size 2 μm) | 100 pbw |
| Water | 500 pbw |

The printable member was evaluated for the same items as in Example 1. The results are also shown in Table 1.

Comparative Example 2

A printable member was prepared by using the same substrate as in Example 1 and a coating solution of the following composition, forming a coating film by a bar coater technique, and drying in a dryer at 120° C. for 10 minutes. The printable surface layer had a thickness of 20 μm and a contact angle of 28° with water at 25° C.

| Coating solution composition | |
|---|---|
| Cation-modified polyvinyl alcohol (saponification 89%, PVA-C-318-2A, Kurare K.K.) | 10 pbw |
| Water | 90 pbw |

The printable member was evaluated for the same items as in Example 1. The results are also shown in Table 1.

Comparative Example 3

A printable member was prepared by the same procedure as in Example 1 except that the coating solution was changed as described below. The printable surface layer had a thickness of 30 μm and a contact angle of 72° with water at 25° C. It was free from carboxyl group.

| Coating solution composition | |
|---|---|
| Polyfunctional oligo-ester acrylate (Aronix 8100, Toa Synthetic Chemical K.K.) | 97 pbw |
| 2-hydroxy-2-methyl-1-phenylpropan-1-one (Darocure 1173, Merck & Co., Inc.) | 3 pbw |

The printable member was evaluated for the same items as in Example 1. The results are also shown in Table 1.

TABLE 1

|  | Adhesion | Ink repellency | Drying time | Oozing | Print water resistance |
| --- | --- | --- | --- | --- | --- |
| Example 1 | ○ | ○ | ○ | ○ | ○ |
| Example 2 | ○ | ○ | ⊙ | ○ | ⊙ |
| Example 3 | ○ | ○ | ⊙ | ○ | ⊙ |
| Example 4 | ○ | ○ | ⊙ | ○ | ○ |
| CE 1 | X | ○ | Δ | ○ | Δ |
| CE 2 | X | ○ | Δ | Δ | Δ |
| CE 3 | ○ | X | X | — | X |

As is evident from Table 1, the printable surface layer of the printable member according to the present invention is well adhesive to a hydrophobic substrate and properly printable or writable with an ink containing a water-soluble dye.

Example 5

| Protective film composition | |
| --- | --- |
| Polyfunctional oligo-ester acrylate (Aronix M-8100, Toa Synthetic Chemical K.K.) | 97 pbw |
| 2-hydroxy-2-methyl-1-phenylpropan-1-one (Darocure 1173, Merck & Co., Inc.) | 3 pbw |

A recordable compact disc (CD-R) having a protective film 15 of UV-cured resin which was obtained by applying a coating composition of the above-mentioned protective film formulation onto a reflective layer 14 and irradiating UV radiation thereto for curing by means of a UV irradiating device. A coating film was formed on the protective film by coating a coating solution of the following printable surface layer composition by a screen printing technique and cured by irradiating UV radiation of 160 W/cm by a UV irradiating device Model UVM-602 (Ushio Electric K. K.) at a distance of 230 mm. The printable surface layer had a thickness of 20 μm, and smectite had a mean major diameter of 10 μm as viewed from the surface.

| Printable surface layer | |
| --- | --- |
| Polyfunctional oligo-ester acrylate (Aronix M-8100, Toa Synthetic Chemical K.K.) | 70 pbw |
| 2-hydroxy-2-methyl-1-phenylpropan-1-one (Darocure 1173, Merck & Co., Inc.) | 5 pbw |
| Smectite (lipophilic, quaternary ammonium substitution, SAN, Corp Chemical K.K, $S_{BET}$ 710–760 m²/g) | 25 pbw |

The printable surface layer of the resulting optical recording medium was evaluated by the following methods. The results are shown in Table 2. Setting was carried out for evaluation by the ink jet recording system using ink of the following composition.

| Ink composition | |
| --- | --- |
| C.I. Direct Black 19 | 5 pbw |
| Diethylene glycol | 30 pbw |
| Water | 65 pbw |

The printable surface layer was evaluated in terms of (1) ink repellency, (2) drying time of printed characters, and (3) water resistance of printed characters.

Evaluation was made by the following methods.

(1) Ink Repellency

Characters were printed before it was determined whether or not ink was repelled. The printable surface layer was rated "O" when characters were properly printed without ink repellency and "X" when ink was repelled to hinder normal setting. Note that the ink repellency to hinder normal setting occurs when the contact angle of the printable surface layer with ink at 25° C. exceeds 60°.

(2) Drying Time of Printed Characters

The drying time is a time taken from setting until the printed ink becomes tack-free to fingers touching the printed surface. It was rated "⊙" when the drying time was up to 30 seconds, "O" when the drying time was from more than 30 seconds to 1 minute, "Δ" when the drying time was more than 1 minute, and "X" when ink remained wet over 24 hours.

(3) Water Resistance of Printed Characters

Characters were printed and dried before the printed surface layer was placed in flowing water for 1 minute. Through visual inspection, ratings were "⊙" when no oozing of printed characters was found, "O" when slight oozing of printed characters was found, "Δ" when oozing of printed characters was apparent, and "X" when printed characters disappeared.

Example 6

An optical recording medium having a printable surface layer was prepared by the same procedure as in Example 1 except that the type of smectite was changed from SAN in Example 5 to STN (lipophilic, quaternary ammonium substitution type, Corp Chemical K. K.). The printable surface layer of the resulting optical recording medium was evaluated as in Example 5. The printable surface layer had a thickness of 30 μm, and smectite had a mean major diameter of 5 μm as viewed from the surface. The results are also shown in Table 2.

Example 7

An optical recording medium having a printable surface layer was prepared by the same procedure as in Example 5 except that a coating solution of the following printable surface layer composition was used. The printable surface layer of the resulting optical recording medium was evaluated as in Example 5. The printable surface layer had a thickness of 50 μm, and smectite had a mean major diameter of 40 μm as viewed from the surface. The results are also shown in Table 1.

| Printable surface layer | |
| --- | --- |
| Polyfunctional oligo-ester acrylate (Aronix M-8100, Toa Synthetic Chemical K.K.) | 35 pbw |
| 2-hydroxy-2-methyl-1-phenylpropan-1-one (Darocure 1173, Merck & Co., Inc.) | 5 pbw |
| Polyethylene glycol monomethacrylate (structure of formula (y), Blenmer PE-350, Nihon Yushi K.K.) | 35 pbw |

-continued

| Printable surface layer | |
|---|---|
| Smectite (lipophilic, quaternary ammonium substitution, SAN, Corp Chemical K.K, $S_{BET}$ 710–760 m²/g) | 25 pbw |
| Formula (y): | (n = 7 to 9) |

$$H_2C=C\overset{CH_3}{\underset{|}{|}}\overset{O}{\underset{\|}{-}}C-O-(CH_2CH_2O)_n-H$$

Example 8

An optical recording medium 1 having a layer serving as both a protective film 15 and a printable surface layer 17 was prepared by coating onto the reflective layer 14 the printable surface layer composition used in Example 5 instead of the coating composition of the protective film formulation used in Example 5, and irradiating UV radiation for curing by means of a UV irradiating device. The printable surface layer 17 (also serving as the protective layer 15) of the resulting optical recording medium 1 was evaluated as in Example 5. The printable surface layer 17 had a thickness of 40 μm, and smectite contained therein had a mean major diameter of 45 μm as viewed from the surface. The results are also shown in Table 2.

Example 9

An optical recording medium 1 was prepared by the same procedure as in Example 5 except that a coating solution of the following printable surface layer composition was used. The printable surface layer 17 of the resulting optical recording medium 1 was evaluated as in Example 5. The printable surface layer 17 had a thickness of 25 μm, and smectite had a mean major diameter of 30 μm as viewed from the surface. The results are also shown in Table 2.

| Printable surface layer | |
|---|---|
| Polyfunctional oligo-ester acrylate (Aronix M-8100, Toa Synthetic Chemical K.K.) | 80 pbw |
| 2-hydroxy-2-methyl-1-phenylpropan-1-one (Darocure 1173, Merck & Co., Inc.) | 5 pbw |
| Smectite (lipophilic, quaternary ammonium substitution, SAN, Corp Chemical K.K, $S_{BET}$ 710–760 m²/g) | 15 pbw |

Example 10

An optical recording medium having a printable surface layer was prepared by the same procedure as in Example 5 except that a coating solution of the following printable surface layer composition was used. The printable surface layer of the resulting optical recording medium was evaluated as in Example 5. The printable surface layer had a thickness of 50 μm, and smectite had a mean major diameter of 10 μm as viewed from the surface. The results are also shown in Table 2.

| Printable surface layer | |
|---|---|
| Monofunctional oligo-ester acrylate (Aronix M-5600, Toa Synthetic Chemical K.K.) | 40 pbw |
| Polyfunctional oligo-ester acrylate (Aronix M-8100, Toa Synthetic Chemical K.K.) | 35 pbw |
| 2-hydroxy-2-methyl-1-phenylpropan-1-one | 5 pbw |
| (Darocure 1173, Merck & Co., Inc.) | |
| Smectite (lipophilic, quaternary ammonium substitution, SAN, Corp Chemical K.K, $S_{BET}$ 710–760 m²/g) | 20 pbw |

Comparative Example 4

An optical recording medium 1 having a printable surface layer 17 was prepared by the same procedure as in Example 5 except that silica (Aerosil, Aerosil K. K., mean particle size 16 μm) was used instead of the smectite used in Example 5. The printable surface layer 17 of the resulting optical recording medium 1 was evaluated as in Example 5. The printable surface layer 17 had a thickness of 30 μm. The results are also shown in Table 2.

Comparative Example 5

An optical recording medium 1 having a printable surface layer 17 was prepared by the same procedure as in Example 5 except that silica gel (mean particle size 20 μm) was used instead of the smectite used in Example 5. The printable surface layer 17 of the resulting optical recording medium 1 was evaluated as in Example 5. The printable surface layer 17 had a thickness of 40 μm. The results are also shown in Table 2.

Comparative Example 6

An optical recording medium 1 having a printable surface layer 17 was prepared by the same procedure as in Example 5 except that in the printable surface layer composition of Example 5, smectite was omitted and the amount of polyfunctional oligo-ester acrylate (Aronix M-8100) was 95 parts by weight. The printable surface layer 17 of the resulting optical recording medium 1 was evaluated as in Example 5. The printable surface layer 17 had a thickness of 35 μm. The results are also shown in Table 2.

Comparative Example 7

A coating solution of the printable surface layer composition was prepared by the same procedure as in Example 5 except that the type of smectite used in Example 5 was changed to SWA (hydrophilic, Corp Chemical K. K., $S_{BET}$: 200 m²/g). However, the coating solution could not be prepared because the smectite used was not dispersed in the solution.

TABLE 2

|  | Ink repellency | Print drying time | Print water resistance |
|---|---|---|---|
| Example 5 | ○ | ⊙ | ⊙ |
| Example 6 | ○ | ⊙ | ⊙ |
| Example 7 | ○ | ⊙ | ⊙ |
| Example 8 | ○ | ⊙ | ⊙ |
| Example 9 | ○ | ⊙ | ⊙ |
| Example 10 | ○ | ⊙ | ⊙ |
| Comparative Example 4 | ○ | ○ | X |
| Comparative Example 5 | ○ | ○ | X |
| Comparative Example 6 | X | X | X |

As is evident from Table 2, the optical recording media having the printable surface layer according to the present invention are printable or writable with an ink containing a water-soluble dye, free of oozing of printed characters, fast in drying rate of printed characters and high in water resistance of printed characters. In contrast, those media having a printable surface layer containing conventional porous particles, silica (Aerosil) or silica gel instead of smectite are poor in drying rate and water resistance of printed characters, and the medium having a printable surface layer free of smectite is repellent to ink and not printable.

BENEFITS

According to the present invention, a printable surface layer can be formed through a single coating step and is firmly adhesive to a hydrophobic substrate. Particularly when crosslinked, the printable surface layer is improved in water resistance of itself and of printed characters. In the second embodiment, printed characters have a high drying rate and high water resistance.

We claim:

1. An optical recording medium comprising:

a substrate;

an optical recording layer and a surface layer formed on said substrate, said surface layer being printable with an ink containing a water-soluble dye, said surface layer being a cured film of a coating composition containing a copolymerizable monomer and oligomer having at least one carboxyl group, and said surface layer further containing porous particles containing a smectite-organic composite.

2. The optical recording medium of claim 1 wherein said surface layer contains a polymerization initiator.

3. The optical recording medium of claim 1 wherein the printable surface layer contains a crosslinking agent.

4. The optical recording medium of claim 1, wherein at least one of said monomer and oligomer is at least one member selected from the group consisting of acrylic acid, methacrylic acid, allyacetic acid, allyloxpropionic acid, itaconic acid, maleic acid, allymalonic acid and oligomers thereof.

5. The optical recording medium of claim 1, wherein at least one of said monomer and oligomer contains at least 1% by weight based on the weight of said surface layer of a carboxyl group.

6. The optical recording medium of claim 1 further comprising a radiation-cured protective film between said optical recording layer and said surface layer.

7. The optical recording medium of claim 1 further comprising a ultraviolet-cured protective film between said optical recording layer and said surface layer.

8. The optical recording medium of claim 1 wherein the surface layer is cured with ultraviolet radiation.

9. The optical recording medium of claim 1 being adapted for printing by an ink jet recording system.

10. An optical recording medium comprising:

a substrate;

an optical recording layer and a surface layer formed on said substrate, said surface layer being printable with an ink containing a water-soluble dye, and said surface layer containing a smectite-organic composite.

11. The optical recording medium of claim 10 wherein said surface layer contains 1 to 50% by weight of smectite-organic composite.

12. The optical recording medium of claim 10 wherein said surface layer is a cured film of a coating composition further containing a radiation curable compound.

13. The optical recording medium of claim 12 wherein said surface layer is cured with ultraviolet radiation.

14. The optical recording medium on claim 10 wherein said surface layer has a thickness of 1 to 100 μm.

15. The optical recording medium of claim 10 being adapted for printing by an ink jet recording system.

16. An optical recording medium comprising:

a substrate;

an optical recording layer and a surface layer formed on said substrate, said surface layer being printable with an ink containing a water-soluble dye, said surface layer being a cured film of a coating containing composition at least one of a copolymerizable monomer and oligomer having at least one carboxyl group, and said surface layer further containing porous particles containing a smectite-organic composite.

17. The optical recording medium of claim 16, wherein said printable surface layer contains a polymerizable initiator.

18. The optical recording medium of claim 16, wherein said printable surface layer contains a crosslinking agent.

19. The optical recording medium of claim 16, wherein said monomer or oligomer is at least one member selected from the group consisting of acrylic acid, methacrylic acid, allyacetic acid, allyloxpropionic acid, itaconic acid, maleic acid, allymalonic acid and oligomers thereof.

20. The optical recording medium of claim 16, wherein said monomer or oligomer contains at least 1% by weight based on the weight of said surface layer of a carboxyl group.

21. The optical recording medium of claim 16, further comprising a radiation-cured protective film between said optical recording layer and said surface layer.

22. The optical recording medium of claim 16, further comprising a ultraviolet-cured protective film between said optical recording layer and said surface layer.

23. The optical recording medium of claim 16, wherein said surface layer is cured with ultraviolet radiation.

24. The optical recording medium of claim 16 being adapted for printing by an ink jet recording system.

* * * * *

UNITED STATES PATENT AND TRADEMARK OFFICE
CERTIFICATE OF CORRECTION

PATENT NO.  : 5,599,649
DATED       : 4 February 97
INVENTOR(S) : Masahiro SHINKAI ET AL.

It is certified that error appears in the above-identified patent and that said Letters Patent is hereby corrected as shown below:

Column 26, lines 26-27 should read in part:
"... a coating composition containing ..."

Signed and Sealed this

Sixth Day of May, 1997

Attest:

BRUCE LEHMAN

Attesting Officer      Commissioner of Patents and Trademarks